United States Patent [19]

Krishnan et al.

[11] Patent Number: 5,173,111
[45] Date of Patent: * Dec. 22, 1992

[54] ABRASION RESISTANT PRINTING INKS

[75] Inventors: Ramasamy Krishnan, Sewaren; Prasad K. Adhikari, Carlstadt, both of N.J.

[73] Assignee: Sun Chemical Corporation, Fort Lee, N.J.

[*] Notice: The portion of the term of this patent subsequent to Mar. 24, 2009 has been disclaimed.

[21] Appl. No.: 793,745

[22] Filed: Nov. 18, 1991

[51] Int. Cl.⁵ ............................................. C09D 11/02
[52] U.S. Cl. .............................. 106/20 R; 106/23 R
[58] Field of Search ................................ 106/20, 23

[56] References Cited

U.S. PATENT DOCUMENTS

| | | | |
|---|---|---|---|
| 4,385,901 | 5/1983 | Podder | 106/22 |
| 4,427,810 | 1/1984 | Chisvette et al. | 106/20 |
| 4,465,492 | 8/1984 | Putzar | 106/20 |
| 4,545,818 | 10/1985 | Inoue et al. | 106/20 |
| 4,699,660 | 10/1987 | Frank et al. | 106/20 |
| 4,762,568 | 8/1988 | Nakamura et al. | 106/497 |
| 4,872,916 | 10/1989 | Latosky | 106/497 |
| 4,910,236 | 3/1990 | Foye et al. | 106/23 |
| 5,098,478 | 3/1992 | Krishnan et al. | 106/20 |

FOREIGN PATENT DOCUMENTS 002086 1/1990 Japan .

Primary Examiner—William R. Dixon, Jr.
Assistant Examiner—Helene Klemanski
Attorney, Agent, or Firm—Jack Matalon

[57] ABSTRACT

Printing inks comprising a pigment and an aqueous or non-aqueous solvent (or a mixture of such solvents) have reduced abrasiveness towards printing surfaces (e.g. gravure printing cylinders) by incorporation in the ink of an alkoxylated dibasic phosphate ester and at least one alkali metal salt of a dialkylsulfosuccinic ester.

6 Claims, No Drawings

ABRASION RESISTANT PRINTING INKS

FIELD OF THE INVENTION

The invention relates to printing inks which exhibit reduced abrasiveness towards printing surfaces such as gravure cylinders. The printing inks will contain the usual pigment and aqueous or non-aqueous solvent (or mixture of such solvents) along with desired binders, fillers, waxes, etc. The printing inks of the present invention exhibit reduced abrasiveness as a result of incorporation therein of an alkoxylated dibasic phosphate ester and at least one alkali metal salt of a dialkylsulfosuccinic ester.

BACKGROUND OF THE INVENTION

Abrasion by printing ink on printing ink surfaces has continued to plague the industry. The problem is most severe in the case of gravure printing wherein after long printing runs, the surfaces of the doctor blade and the gravure cylinder wear out. This in turn causes "hazing" or "scumming", i.e. printing in the non-image areas. The phenomenon is particularly acute when water-based inks are used in place of non-aqueous inks. Environmental, health and safety considerations dictate that, to the extent possible, solvents such as hydrocarbons, alcohols, glycols, glycol ethers, ketones and esters be replaced with water. Thus, solving the abrasion problem would provide a greater incentive to printers to utilize water-based inks.

Abrasion of the printing surfaces is, no doubt, related to factors such as the type of pigment, pigment crystal morphology, pigment particle size, etc. It is thought that water provides less lubricity than solvents. However, incorporation of materials thought in the prior art to provide lubricity such as waxes, stearates, etc. have had little effect in reducing the abrasion caused by water-based inks after long printing runs.

DETAILS OF THE INVENTION

It has now been discovered that the abrasiveness of both aqueous and non-aqueous printing inks towards printing surfaces is significantly reduced if an alkoxylated dibasic phosphate ester and at least one alkali metal salt of a dialkylsulfosuccinic ester are incorporated in the ink.

Preferably, the alkoxyl moiety of the alkoxylated dibasic phosphate ester contains 2-8, most preferably 4-6, carbon atoms, and the alcohol moiety of the alkoxylated dibasic phosphate ester contains 5-10, most preferably 7-10 carbon atoms, e.g. aromatic alcohol groups. The alkoxylated dibasic phosphate ester is generally present in an amount of about 2-6, preferably 3-5, wt. %, based on the weight of the printing ink.

The alkali metal salt of the dialkylsulfosuccinic ester preferably comprises sodium, and each dialkyl moiety contains 8-16, preferably 8-13 carbon atoms. Most preferably, the dialkylsulfosuccinic ester comprises a mixture of two different dialkylsulfosuccinic esters, one in which the dialkyl moieties are branched chain ethylhexyl groups, and the other in which the dialkyl moieties are tridecyl. Generally, the total amount of all alkali metal salts of the dialkylsulfosuccinic ester(s) will be in the range of about 0.5-3, preferably 0.8-1.5, wt. %, based on the weight of the printing ink.

As indicated in the Examples presented below, incorporation of the phosphate ester or the sulfosuccinic ester alone results in no significant reduction in abrasiveness. Both the phosphate ester and the sulfosuccinic ester are required and especially good results are achieved if equal amounts of two different sulfosuccinic esters, rather than a single sulfosuccinic ester, are employed in combination with the phosphate ester. Further, the present invention is equally effective in water-based printing inks, solvent-based printing inks and printing inks containing both water and non-aqueous solvents.

Apart from the present invention, the printing ink components are conventional in nature. As indicated above, the solvent may be water, non-aqueous solvents or a mixture thereof. Typical solvents include aliphatic hydrocarbons, naphthenic hydrocarbons, aromatic hydrocarbons (e.g. toluene, xylene), $C_1$–$C_4$ alcohols, $C_2$–$C_{12}$ glycols and glycol ethers, ketones, esters, etc.

The pigment is conventional in nature and may be any organic pigment used in printing inks or may be inorganic in nature, e.g. monoarylide yellows, diarylide yellows, pyrazolones, bezimidazolones, toluidine red, naphthol red, lithol rubines, phthalocyanine blue and green, carbon blacks, titanium dioxide, zinc sulphide, calcium carbonate, China clay, etc. Typically, the printing ink will also contain binders, e.g. rosins and/or resins such as wood rosin, metallic resinates, maleic-modified rosins and resins, phenolic resins, alkyd resins, polyamide resins, acrylic and methacrylic resins, etc. The printing ink may also contain oils (e.g. soy bean oil), plasticizers, natural and/or synthetic waxes, driers, extenders, etc.

The laboratory test used to evaluate the abrasiveness of a printing ink involves the following procedure: 20 g of the printing ink is placed in a tray and a chromium-coated glass is immersed in the ink. A felt-covered weight is rubbed against the glass for a fixed number of strokes. The abrasiveness of the ink is then determined as a function of the amount of chromium coating removed from the glass.

The invention may be better understood by reference to the following examples; all parts are by weight or wt. % unless otherwise indicated.

EXAMPLE 1

A water based ink was formulated from the following materials:

| Material | Wt. % |
| --- | --- |
| Zinc sulphide | 40 |
| Acrylic emulsion[a] | 15 |
| Acrylic resin solution[b] | 25 |
| Ethylene glycol monopropyl ether | 5 |
| Water | 13 |
| Ammonia | 2 |

[a]This emulsion consisted of emulsified styrene-acrylic copolymer of about 200,000 mol. wt. and about 40% solids.
[b]This solution consisted of styrene-acrylic copolymer of about 10,000 mol. wt. neutralized with ammonia and about 40% solids.

After 3,000 rubs in the abrasion tester, the abrasion produced by this printing ink formulation was rated 7 on a scale of 1 to 10 (10 being the worst).

EXAMPLE 2

The ink of Example 1 was reformulated by the addition of 4% of a phosphate ester composition consisting of a mixture of a nonoxy phenoxy ethoxylated phosphate and a heptyl ethoxylated phosphate in about an 80:20 ratio. After 3,000 rubs in the abrasion tester, the abrasion produced by this ink formulation was rated 4.

EXAMPLE 3

The ink of Example 1 was reformulated by the addition of 2% of sodium 2-ethylhexyl sulfosuccinate and tested by the same method as above; this ink was rated 6 after 3,000 rubs.

EXAMPLE 4

Example 3 was repeated using 2% of sodium tridecyl sulfosuccinate; this ink was rated 6 after 3,000 rubs.

EXAMPLE 5

Example 3 was repeated using a mixture of 1% of sodium 2-ethylhexyl sulfosuccinate and 1% of sodium tridecyl sulfosuccinate; this ink was rated 4 after 3,000 rubs.

EXAMPLE 6

The ink of Example 1 was reformulated by the addition of 4% of a phosphate ester composition consisting of a mixture of a nonoxy phenoxy ethoxylated phosphate and a heptyl ethoxylated phosphate in about an 80:20 ratio and 2% of sodium 2-ethylhexyl sulfosuccinate; this ink was rated 3 after 3,000 rubs.

EXAMPLE 7

The ink of Example 1 was reformulated by the addition of 4% of a phosphate ester composition consisting of a mixture of a nonoxy phenoxy ethoxylated phosphate and a heptyl ethoxylated phosphate in about an 80:20 ratio, 1% of sodium 2-ethylhexyl sulfosuccinate and 1% of sodium tridecyl sulfosuccinate; this ink was rated 1 after 3,000 rubs.

EXAMPLE 8

A printing ink base was prepared from 15% "Printex 45" carbon black (a type of carbon black typically used in solvent-based gravure printing inks), 3% "Soleate DO", a standard oleic acid ester wetting agent, 70% Gilsonite varnish (a natural resin) and 12% toluene. These materials were ground for about 2 hours with 3 mm glass shots and the resultant ground dispersion was then diluted to final ink viscosity, as follows: 50% ink base, 45% calcium/zinc resinate varnish and 5% toluene; this ink resulted in a chrome wear of $0.3\mu$. A second ink was prepared in which the "Soleate DO" wetting agent was replaced with 3% sodium 2-ethylhexyl sulfosuccinate; the second ink resulted in a chrome wear of $0.1\mu$. A third ink was prepared in which the "Soleate DO" wetting agent was replaced with 3% sodium 2-ethylhexyl sulfosuccinate and 1% of a phosphate ester composition consisting of a mixture of a nonoxy phenoxy ethoxylated phosphate and a heptyl ethoxylated phosphate in about an 80:20 ratio; the third ink resulted in a chrome wear of $0.5\mu$.

The three inks were then trialled on a commercial high speed gravure printing press. The trials indicated that the additives of the present invention solved the abrasiveness problem associated with conventional inks. These trials also proved that the additives of the present invention are equally effective in solvent based inks.

What is claimed is:

1. A printing ink comprising a pigment and an aqueous or non-aqueous solvent or a mixture of such solvents and having reduced abrasiveness towards printing surfaces characterized in that the ink contains an alkoxylated dibasic phosphate ester and at least one alkali metal salt of a dialkylsulfosuccinic ester, said alkoxylated dibasic phosphate ester being present in an amount 2-6 weight %, based on the weight of the printing ink, and said alkali metal salt of a dialkylsulfosuccinic ester being present in an amount of about 0.5-3 weight %, based on the weight of the printing ink.

2. The printing ink of claim 1 wherein the alkoxyl moiety of the alkoxylated dibasic phosphate ester contains 2-8 carbon atoms.

3. The printing ink of claim 2 wherein the alcohol moiety of the alkoxylated dibasic phosphate ester contains 5-10 carbon atoms.

4. The printing ink of claim 1 wherein the alkali metal comprises sodium and the alkyl moiety of the dialkylsulfosuccinic ester contains 8-16 carbon atoms.

5. The printing ink of claim 4 wherein the dialkylsulfosuccinic ester comprises a mixture of two different dialkylsulfosuccinic esters.

6. The printing ink of claim 5 wherein the dialkyl moieties of one dialkylsulfosuccinic ester are branched ethylhexyl groups and the dialkyl moieties of the other dialkylsulfosuccinic ester are tridecyl groups.

* * * * *